(12) United States Patent
AbiEzzi et al.

(10) Patent No.: US 9,532,103 B2
(45) Date of Patent: Dec. 27, 2016

(54) MULTI-USER SUPPORT FOR SET TOP BOXES AND GAME CONSOLES

(71) Applicant: VMware, Inc., Palo Alto, CA (US)

(72) Inventors: Salim AbiEzzi, Sammamish, WA (US); Ole Agesen, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 91 days.

(21) Appl. No.: 14/107,985

(22) Filed: Dec. 16, 2013

(65) Prior Publication Data

US 2015/0172760 A1   Jun. 18, 2015

(51) Int. Cl.
| | |
|---|---|
| *H04N 21/443* | (2011.01) |
| *G06F 9/455* | (2006.01) |
| *H04N 21/431* | (2011.01) |
| *H04N 21/41* | (2011.01) |
| *H04N 21/478* | (2011.01) |
| *H04N 21/436* | (2011.01) |
| *A63F 13/355* | (2014.01) |
| *A63F 13/32* | (2014.01) |

(52) U.S. Cl.
CPC ........... *H04N 21/4437* (2013.01); *A63F 13/32* (2014.09); *A63F 13/355* (2014.09); *G06F 9/45558* (2013.01); *H04N 21/4104* (2013.01); *H04N 21/4122* (2013.01); *H04N 21/431* (2013.01); *H04N 21/43615* (2013.01); *H04N 21/4781* (2013.01); *G06F 2009/45595* (2013.01)

(58) Field of Classification Search
CPC ............ H04N 21/4437; H04N 21/4104; H04N 21/4122; H04N 21/431; H04N 21/43615; H04N 21/4781; A63F 13/32; A63F 13/355; G06F 9/45558; G06F 2029/45595
See application file for complete search history.

(56) References Cited

U.S. PATENT DOCUMENTS

| | | | |
|---|---|---|---|
| 2003/0149988 A1* | 8/2003 | Ellis et al. | 725/87 |
| 2006/0095401 A1* | 5/2006 | Krikorian | H04N 21/4398 |
| 2007/0198656 A1* | 8/2007 | Mazzaferri et al. | 709/218 |

(Continued)

OTHER PUBLICATIONS

*Hyper-V*. Wikipedia, the free encyclopedia. Last updated Sep. 22, 2013. Retrieved on Sep. 27, 2013. Retrieved from the Internet: URL<http://en.wikipedia.org/w/index.php?title=Hyper-V&oldid=574079624>. 12 pages.

(Continued)

*Primary Examiner* — Justin Shepard
*Assistant Examiner* — Alexander Boyd

(57) ABSTRACT

Systems and techniques are described for multi-user support on set top boxes and game consoles. A described technique includes executing a hypervisor that monitors a plurality of virtual machines that execute a set top box operating system or a game console operating system, providing a selection menu to a first display device, receiving a first selection of a first virtual machine, executing the first virtual machine, providing a first stream of content for a first user interface of the first virtual machine to the first display device, providing the selection menu to a second display device, receiving a second selection of a second virtual machine, executing the second virtual machine, and providing a second stream of content for a second user interface of the second virtual machine to the second display device while providing the first stream to the first display device.

22 Claims, 3 Drawing Sheets

(56) References Cited

U.S. PATENT DOCUMENTS

| | | | |
|---|---|---|---|
| 2007/0250833 A1* | 10/2007 | Araujo, Jr. | G06F 21/6218 |
| | | | 718/1 |
| 2007/0280243 A1* | 12/2007 | Wray et al. | 370/392 |
| 2010/0188575 A1* | 7/2010 | Salomons | H04N 21/43615 |
| | | | 348/553 |
| 2010/0263059 A1* | 10/2010 | Curtis et al. | 726/29 |
| 2011/0023077 A1* | 1/2011 | Simon | H04N 21/4438 |
| | | | 725/134 |
| 2011/0126110 A1* | 5/2011 | Vilke et al. | 715/736 |
| 2011/0302606 A1* | 12/2011 | Berrett | H04N 21/4263 |
| | | | 725/39 |
| 2012/0027374 A1* | 2/2012 | Lipkind | H04N 21/226 |
| | | | 386/230 |
| 2012/0192234 A1* | 7/2012 | Britt | H04N 21/4334 |
| | | | 725/58 |
| 2012/0311564 A1* | 12/2012 | Khalid | 718/1 |
| 2015/0052568 A1* | 2/2015 | Glennon et al. | 725/100 |

OTHER PUBLICATIONS

*Cloud Gaming.* Wikipedia, the free encyclopedia. Last updated Oct. 10, 2013. Retrieved on Oct. 11, 2013. Retrieved from the Internet: URL<http://en.wikipedia.org/w/index.php?title=Cloud_gaming&oldid=576654263>. 7 pages.

* cited by examiner

MULTI-USER SUPPORT FOR SET TOP BOXES AND GAME CONSOLES

BACKGROUND

This document relates to presenting set top box and game console content on a display.

A virtual machine is a software-based abstraction of a physical computer system. In general, any computer program that can be executed on a physical computer system can be executed in a virtual machine using virtualization software. Virtualization software is software that is logically interposed and interfaces with a virtual machine and a physical computer system. Each virtual machine is configured to execute an operating system, referred to herein as a guest OS, and applications. A physical computer system, referred to herein as a host machine, can execute one or more virtual machines.

A virtual machine can be accessed remotely through a network connection. For example, it is possible to use a remote client to access a virtual machine remotely. A remote client is a program that communicates user interface information with a remote system. Generally, the user interface information includes display data, which is received from the remote system and displayed locally to the user, and the remote client sends inputs generated by the user to the remote system. In this way, applications executing remotely from the user can be accessed and interacted with by the user.

SUMMARY

In general, one aspect of the subject matter described in this document can be embodied in a technique that includes executing a hypervisor, wherein the hypervisor monitors a plurality of virtual machines, wherein each of the virtual machines executes a different instance of an operating system, wherein the operating system is a set top box operating system or a game console operating system, providing instructions for presentation of a selection menu across a local area network to a first display device, the instructions including information for selection of a virtual machine from the plurality of virtual machines, receiving a first selection of a first virtual machine from the plurality of virtual machines, executing the first virtual machine, providing a first stream of content for a first user interface of the first virtual machine to the first display device, providing instructions for presentation of the selection menu across a network to a second display device, receiving a second selection of a second virtual machine from the plurality of virtual machines, executing the second virtual machine, and providing a second stream of content for a second user interface of the second virtual machine to the second display device while providing the first stream to the first display device.

These and other aspects can optionally include one or more of the following features. The operating system may be a set top box operating system and the first user interface and the second user interface may comprise different instances of a television guide. The operating system may be a game console operating system and the first user interface and the second user interface may comprise different instances of a console interface. The method may comprise receiving a first selection in the first user interface, providing a first video stream across the local area network to the first display device based on the first selection, receiving a second selection in the second user interface, and providing a second video stream, different from the first video stream, across the network to the second display device while providing the first video stream to the first display device based on the second selection.

In some implementations, the method comprises receiving a command, identifying, by the hypervisor, whether the command is for the first virtual machine or the second virtual machine, and forwarding the command to the identified virtual machine. Receiving the command may comprise receiving information about the command in a network packet, unwrapping the information about the command from the network packet, and forwarding the command to the identified virtual machine comprises forwarding the unwrapped command to the identified virtual machine. The method may comprise detecting a property of the second display or the network, and optimizing the second stream of content using the property. The network may be different from the local area network. The method may comprise configuring network address translation for communications between the hypervisor and the second display device, wherein the property is selected from the group consisting of a latency of the network, a bandwidth of the network, a size of the second display, and a resolution of the second display.

In some implementations, the method comprises receiving a first selection in the first user interface to record a first program, receiving a second selection in the second user interface to record a second program, determining that the first program is the same program as the second program, recording the first program once, and providing the first virtual machine and the second virtual machine access to the recorded first program. The method may comprise receiving a first selection in the first user interface, providing a first video stream from a first tuner across the local area network to the first display device based on the first selection, determining that no additional tuners are available to provide a second video stream, different from the first video stream, across the network to a third display device while providing the first video stream to the first display device, and providing the first video stream from the first tuner across the network to the third display device. The method may comprise providing a selection menu in a third user interface allowing a selection of a video stream provided to one of the plurality of virtual machines based on determining that no additional tuners are available to provide the second video stream, and receiving a third selection for the first video stream, wherein providing the first video stream from the first tuner across the network to the third display device is based on the receipt of the third selection for the first video stream.

Particular embodiments of the subject matter described in this document can be implemented so as to realize one or more of the following advantages. In some implementations, the use of virtual machines allows multiple users to simultaneously view content from the same set top box or game console, reducing hardware and/or operating costs. In some implementations, the use of virtual machines allows a user to move between different rooms and view/resume content in the different rooms with minimal user input, e.g., the user need only select a particular virtual machine to view related content. In some implementations, the use of virtual machines provides multi-user functionality for existing set top boxes and game consoles without modification to the single user operating system or applications.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a framework to distribute content from a set top box, e.g., a device that includes a tuner which receives content from an external source and provides television programming content to a television, or a game console, e.g., a special purpose device that provides video game content to a television, across a network to multiple display devices. Such a framework can enable multiple users to view different content on different displays at the same time.

For example, a set top box with multiple television tuners connects to a network switch and allows a user operating a television to select a virtual machine executing on the set top box. The television then presents content received from the virtual machine to the user, such as a television program guide and, upon selection of a particular program, the content for the selected program, where the live or recorded content is streamed from one of the television tuners or storage, respectively, in the set top box to the television.

While the virtual machine on the set top box provides the content stream to the television, another user may select a different virtual machine executing on the set top box. For example, each virtual machine may be customized by a user such that the user's favorite channels are presented in the television guide or favorite programs recorded on that virtual machine. The other user may then view their television program guide, select a channel, and view content for the selected channel on another display, where another virtual machine utilizing a different television tuner provides the content to the other display.

Figure 1:
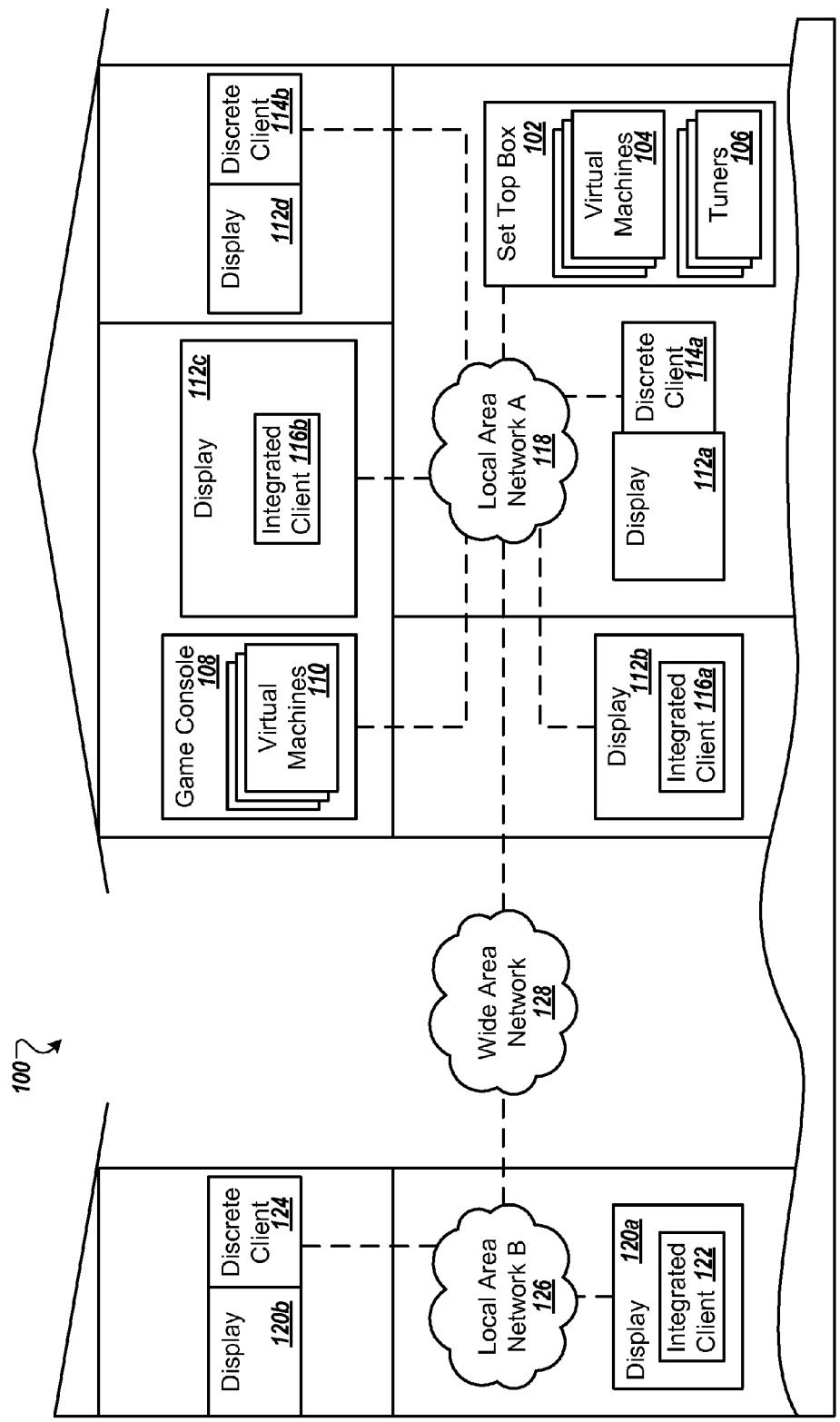
FIG. 1 shows an example environment for executing multiple virtual machines on a set top box or a game console.

FIG. 1 shows an example environment 100 for executing multiple virtual machines on a set top box 102 or a game console 108. The set top box 102 includes multiple virtual machines 104 that each executes an operating system, e.g., different versions of the same operating system, the same version of an operating system, or different operating systems. For example, each of the virtual machines 104 may execute the same set top box operating system and provide a user with the same version of a television program guide. In some examples, some of the virtual machines 104 may execute different software stacks, e.g., different operating systems released by different companies.

When a display 112a is turned on, a user may select to view input from a discrete client 114a connected to the display 112a to present content from the set top box 102 on the display 112a. The discrete client 114a includes a video output port that provides content to the display 112a, e.g., via a cable connected to a video input port, e.g., DisplayPort, or high-definition multimedia interface (HDMI), on the television or through a universal serial bus (USB) port, and the user may select a corresponding input on the display 112a to view content from the discrete client 114a. The discrete client 114a executes a client application that connects to the set top box 102, through a local area network A 118, to request a menu of available virtual machines from the set top box 102 or allow a user to request the creation of a new virtual machine, e.g., for a new user.

The displays 112a-d and 120a-b may be any type of display device that presents content to a user, e.g., a television, a computer monitor, laptop display, or tablet display. When a display does not include an integrated client, e.g., an integrated client 116a, a user may connect a discrete client, e.g., the discrete client 114a, to the display.

The discrete client 114a receives instructions for the presentation of the menu of available virtual machines, e.g., as a content stream, and provides the instructions to the display 112a. For example, the discrete client 114a may receive pixel information as the instructions for the presentation of the menu of available virtual machines, a television guide, or a stream of content, e.g., a live or recorded program. The display 112a presents the menu to the user and the discrete client 114a receives input indicating a user selection of one of the available virtual machines 104. For example, the discrete client 114a may include one or more wireless receivers, e.g., infrared, Bluetooth, WiFi, or radio frequency, that receive commands from a user control, e.g., a remote control or a game controller.

The discrete client 114a sends data regarding the selected virtual machine 104 to the set top box 102. For example, the discrete client 114a sends a display pixel position to the set top box 102 that corresponds with a menu option presented on the display 112a. A hypervisor executing on the set top box 102 receives the data and identifies the selected virtual machine, and the selected virtual machine provides the discrete client 114a with a stream of content. For example, the hypervisor can launch the selected virtual machine 104 and provide a stream of content, which includes commands for presentation of a user interface, e.g., a television program guide, a personal video recorder, or content for a television channel, on a display to the discrete client 114a. The discrete client 114a provides the content stream to the display 112a and the display 112a presents the user interface to the user.

The user may then interact with the user interface presented on the display 112a. For example, the user may select a recorded program in a personal video recorder, or a television channel in a television program guide using a remote control.

The discrete client 114a receives input, e.g., from the remote control, that identifies the selected program or television channel and forwards the received input to the hypervisor. The hypervisor identifies the virtual machine from the virtual machines 104 that is the destination of the input, e.g., based on address information associated with the input, as described in more detail below with reference to FIG. 3. The identified virtual machine then performs an action based on the user selection as if the virtual machine controlled the hardware of the set top box 102 directly and a wireless receiver, e.g., infrared receiver, included in the set top box 102 received the user selection directly from the remote control. For example, the operating system of the virtual machine may execute without knowledge of the other virtual machines 104.

In some implementations, the discrete client 114a determines whether received input should be forwarded to the set top box 102. For example, the discrete client 114a may determine that a command adjusts the volume on the display 112*a* and should not be provided to the set top box 102. In some examples, the discrete client 114*a* forwards all received user input events, including selections, to the set top box 102. One example of a user input event may include movement of a menu selector on a display, e.g., location information for the menu selector.

While the discrete client 114*a* presents content from the set top box 102 on the display 112*a*, a display 112*b* may present content from the set top box 102, e.g., to another user. For example, the display 112*b* may include an integrated client 116*a* running on the display 112*b* that receives content from the set top box 102 and presents the content to the other user. The display 112*b* may present a user with an input source menu that allows a user to select a content source, e.g., HDMI, component video, or an antenna, and includes an option for viewing content from the integrated client 116*a*, e.g., a virtual machine option. The integrated client 116*a* operates in the same manner as the discrete client 114*a*.

The display 112*b* may provide the other user with a similar experience as the display 112*a* and the discrete client 114*a*. For example, the display 112*b* may provide the user with a list of virtual machines and, upon selection of one of the virtual machines, may provide the user with content associated with the virtual machine, such as a television program.

The content may be the same content presented by the display 112*a* or may be different content. For example, the other user may select the same channel as the user interacting with the display 112*a* or may select a different channel.

The set top box 102 includes multiple tuners 106 for providing the content to the display 112*a* and the display 112*b*. For example, when the hypervisor receives a selection for watching live television content on a first virtual machine by the discrete client 114*a*, the hypervisor assigns a first tuner from the tuners 106 to the first virtual machine where the tuner receives, and potentially decodes, content for the first virtual machine. When the hypervisor receives selection for watching live television content on a second virtual machine from the integrated client 116*a*, the hypervisor assigns a second, different tuner from the tuners 106 to the second virtual machine, and the second tuner receives, and potentially decodes, content for the second virtual machine.

Each of the virtual machines 104 includes settings that may be customized by a user. For example, a set top box operating system may include a default channel, a television program guide layout, a list of favorite channels, parental controls, and so on, that may be customized by an administrator and each user. When the users are presented with a list of virtual machines, the list may include user specific information, such as the user's name, to allow the user to identify the virtual machine they customized.

Like the set top box 102, the game console 108 includes a hypervisor and multiple virtual machines 110. The operating systems executed by each of the virtual machines 110 may be the same or different. For example, two or more of the virtual machines 110 may execute different versions of the same operating system, e.g., when a first user updates the operating system of a first virtual machine while a second user does not update the operating system of a second virtual machine. The game console 108 allows a user to select one of the virtual machines 110 to view a content menu in a console interface. The user may then select to watch a movie, e.g., from a streaming service that provides a video selection interface, or play a game installed on the game console 108, a game installed on a network or cloud drive, or a game from a media drive included in the game console 108, e.g., a disc drive or USB drive.

The game console 108 allows multiple users to interact with the game console 108 and play games at the same time. For example, a first user using the display 112*a* and the discrete client 114*a* may play a first game installed on the game console 108 while a second user using the display 112*c* and the integrated client 116*a* may play a second game launched from a disc in a media drive. In some examples, multiple virtual machines may present content from the same game at the same time.

In some implementations, the game console 108 includes multiple media drives. For example, a first media drive may include a disc for a first game while a second media drive includes a disc for a second game. The display 112*d* and the display 112*b* may present content for the first and the second games, respectively.

In some implementations, the game console 108 includes multiple video cards. For example, when a virtual machine provides content to a client, a video card assigned to the virtual machine may generate the content. In some implementations, a single video card generates content for multiple virtual machines.

In some implementations, when multiple devices with virtual machines are connected to the local area network A 118, the discrete clients 114*a-b* and the integrated clients 116*a-b* may present a user with a device selection menu. For example, the menu may allow a user to select between the set top box 102 and the game console 108. Upon receipt of the selection, the client may present the user with a list of virtual machines for the selected device. In some examples, the display 112*a* may present content from the game console 108 while the display 112*c* presents content from the set top box 102.

When a user disconnects from a session with the set top box 102 or the game console 108, the user may continue the session on another client device. For example, when a user is viewing content for a particular virtual machine on the display 112*a*, the user may disconnect the session with the discrete client 114*a* and select the same particular virtual machine using the integrated client 116*a* to continue viewing the content on a different display 112*b*.

In some implementations, the environment 100 includes a display 120*a* with an integrated client 122 and/or a display 120*b* with a discrete client 124 located at a different site than the location of the set top box 102 and the game console 108. For example, the set top box 102 and the game console 108 may be at a first user's home while the displays 120*a-b* are located at a hotel or a second user's home or included in a mobile device, e.g., physically located at an airport or another location. The integrated client 122 and the discrete client 124 connect to a local area network B 126 and, through a wide area network 128, to the local area network A 118 and the set top box 102 and the game console 108.

Each of the set top box virtual machines 104 and the game console virtual machines 110 has a separate Internet Protocol (IP) address on the local area network A 118. For example, the discrete clients 114*a-b* and the integrated clients 116*a-b* may then use the IP address of the selected virtual machine to interact with and receive content from the selected virtual machine.

The integrated client 122 or the discrete client 124 may configure a network address translation (NAT) table to connect to the set top box 102 or the game console 108 and select a virtual machine on the corresponding device. For example, the integrated client 122 or the discrete client 124 may associate a port number with the IP address of the selected virtual machine in the NAT table, e.g., on a gateway for the local area network A 118. The gateway may be a security gateway and/or a router. The integrated client 122 or the discrete client 124 may then use the IP address of the a gateway for the local area network A 118 and the port associated with the selected virtual machine to interact with and receive content from the selected virtual machine. The integrated client 122 and the discrete client 124 may use a security gateway, e.g., to authenticate users, and NAT traversal and firewall traversal techniques to connect to the virtual machines 104 and the virtual machines 110. For example, a firewall included in the local area network A 118 and/or the local area network B 126 may be configured to allow the integrated client 122 and the discrete client 124 access to the set top box 102 and the game console 108.

In some implementations, the virtual machines 104 and the virtual machines 110 optimize content for the size of the display that presents the content and/or the network bandwidth between a virtual machine and a corresponding client. For example, a virtual machine may provide a stream to a large display 112c, e.g., a high definition television, compared to a stream to a small display 112d, e.g., a smartphone.

In some examples, a virtual machine provides a higher bit-rate stream to the display 112a compared to the display 120a based on the networks between the virtual machine and the displays. For example, the higher bit-rate may be a larger resolution or display size or may be a higher quantity of frames per second that requires more bandwidth than available on the wide area network 128, e.g., the Internet.

In some implementations, the clients, e.g., the discrete clients 114a-b and the integrated clients 116a-b, may present a virtual machines configuration menu and a virtual machine selection menu. The virtual machine selection menu allows user to select a virtual machine from the set top box 102 or the game console 108 and enter credentials if required.

The virtual machines configuration menu may allow a user to create and/or remove virtual machines, e.g., from a list of virtual machines for the set top box 102 and the game console 108. The virtual machines configuration menu may also allow a user to assign labels and/or create authentication credentials for the virtual machines. The virtual machine configuration menu may allow a user to add virtual machine source devices to a list of available sources on the client, such as the set top box 102, the game console 108, or a combination of multiple devices. In some examples, a client may use auto-discovery protocols to determine the list of available sources, e.g., by determining all devices running a hypervisor and sending queries to those devices for a list of hosted virtual machines.

The clients may provide a user with a list of virtual machines that includes only virtual machines that match one or more predetermined characteristics. For example, an administrator may identify the predetermined characteristics, e.g., based on a user's name. When the client presents the virtual machine selection menu, the virtual machine selection menu would include only the list of virtual machines that match the predetermined characteristics.

In some implementations, when one of the discrete clients 114a-b provides content to a display device, the discrete client receives commands, e.g., infrared commands, from an input device, e.g., an infrared receiver, and forwards the commands to the corresponding virtual machine.

In some implementations, the set top box 102 may record content for one or more of the virtual machines. For example, the set top box 102 may include digital video recorder functionality. When the hypervisor determines that two or more of the virtual machines 104 request recording of the same content, the hypervisor may assign a single tuner from the tuners 106 to record the content once to allow multiple users to access the recorded content while reducing the amount of memory required to store the content. After recording of the content, the virtual machines 104 maintain separate playback contexts in relation to the same recorded content and may play the content, or potentially different portions of the content, at the same time. When the recorded content is removed from one of the virtual machines, the hypervisor removes that virtual machines access to the recorded content without removing the recorded content from memory until all virtual machines have requested deletion of the recorded content.

In some implementations, when two virtual machines on the set top box 102 provide the same live content to two different clients, the set top box 102 may use a single tuner to provide the live content to the clients. For example, the hypervisor may assign the same tuner to both virtual machines, and the tuner may receive the live content, and the set top box 102 may encode and packetize the data once, and the virtual machines provide the packetized data to the corresponding clients.

In some implementations, a single virtual machine may be accessed by two different clients at the same time. One of the sessions is a primary session, where a user can change the content presented by the virtual machine, while the other session is a secondary session, where a user cannot interact with the content presented by the virtual machine.

In some examples, when a client connects to the set top box 102 or the game console 108 and the hypervisor of the corresponding device cannot allow the client to connect to a new virtual machine, e.g., because the device is executing a maximum quantity of virtual machines, the hypervisor allows the client to connect to a currently executing virtual machine as a secondary session. For example, when the discrete client 114a requests access to live content from the set top box 102 and all of the tuners 106 are in use, the discrete client 114a may create a secondary session for one of the already executing virtual machines 104 to allow the discrete client 114a to present content to a user while a primary session with the virtual machine controls what content is presented, e.g., which channel is selected by the corresponding tuner.

In some implementations, a virtual machine on the set top box 102 may allow a user to request that the virtual machine record a first program while presenting a second program to the user. For example, a virtual machine may use a first tuner to record the first program while the virtual machine uses a second tuner to provide the second live program to a display.

In some implementations, a single display may present content from multiple virtual machines at the same time. For example, the integrated client 116a may create two sessions with two different virtual machines and present content from both virtual machines on the display 112b at the same time. The virtual machines may execute on the same hardware, e.g., where both virtual machines execute on the set top box 102, or different hardware, e.g., the game console 108 and the set top box 102.

In some examples, a streaming video device may execute multiple virtual machines and provide content to multiple clients, e.g., the discrete clients 114a-b and/or the integrated clients 116a-b, at the same time. For example, the streaming video device may provide content from a first streaming video service to the discrete client 114a while providing different content from a second streaming video service to the integrated client 116a. Similar to the set top box 102 and the game console 108, the streaming video device includes a hypervisor and multiple virtual machines and the operating systems of the virtual machines may be the same or different. The streaming video device allows a user to select one of the virtual machines, similar to user interaction with the set top box 102 and the game console 108, to view a content menu and select a movie or television program from the content menu.

Figure 2:
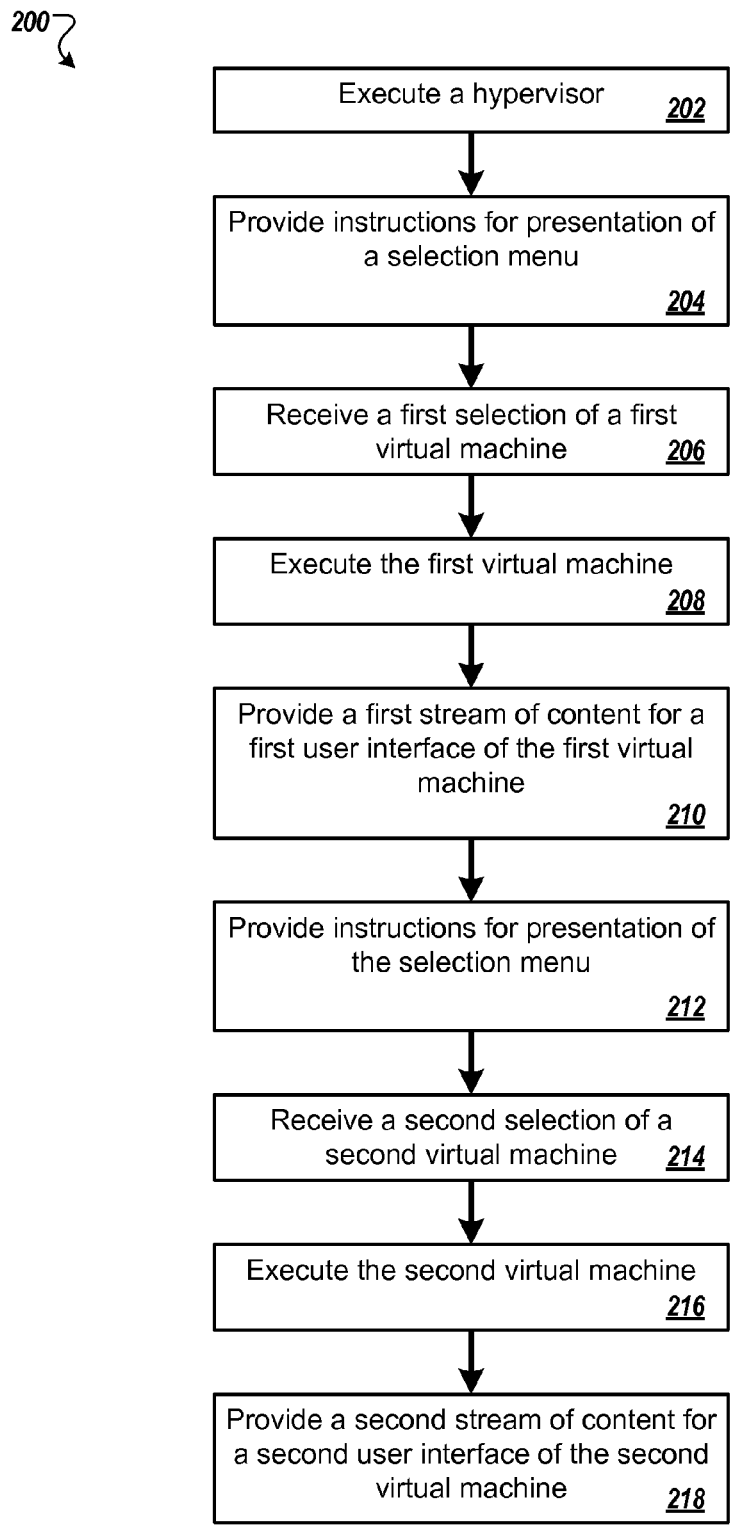
FIG. 2 is a flow diagram of a process for providing content to two display devices at the same time.

FIG. 2 is a flow diagram of a process 200 for providing content to two display devices at the same time. For example, the process 200 can be used by a media device, e.g., the set top box 102 or the game console 108 from the environment 100.

The media device executes a hypervisor (202). The hypervisor monitors multiple virtual machines, each of which executes an operating system. The operating system may be either a set top box operating system or a game console operating system. For example, the virtual machines may execute different versions of the same operating system.

The operating system includes an unmodified software stack. For example, the media device may execute an operating system developed for execution directly on the hardware of the media device without the use of the hypervisor and multiple virtual machines.

The media device provides instructions for presentation of a selection menu to a first display device (204). For example, the hypervisor provides instructions for presentation of the selection menu across a local area network to a first display device. The selection menu allows a user to select a virtual machine from the multiple virtual machines or to create a new virtual machine.

In some implementations, the selection menu may be a login menu. For example, the selection menu may allow a user to enter a user name that corresponds with one of the multiple virtual machines or to select a virtual machine from a list of available virtual machines. The login menu may include a field for the user to enter a password associated with the user name.

The instructions for the selection menu may be received directly by the first display device, e.g., when the first display device includes a network port and an integrated software client that connects with the hypervisor across the local area network, or by a discrete hardware client connected to the first display device. For example, the discrete hardware client may include a network port and execute a software client that connects with the hypervisor across the local area network. The discrete hardware client then provides the instructions for the selection menu directly to the first display device or optimizes the selection menu for presentation on the first display device.

The media device receives a first selection of a first virtual machine (206). For example, the hypervisor may receive data representing a selection of one of the multiple virtual machines. The data may include a user name and/or a password.

The media device executes the first virtual machine (208). That is, the hypervisor identifies the first virtual machine and launches the first virtual machine. If log-in credentials are received, the hypervisor may verify the credentials prior to launching the first virtual machine.

The first virtual machine may use data, e.g., a user setting or data for a previous virtual machine session, associated with the first virtual machine during execution. For example, the first virtual machine may determine what content was last presented, e.g., a channel, menu, game, movie, etc., and display the last presented content. This may allow a user to continue their last session with the first virtual machine with minimal input.

The media device provides a first stream of content for a first user interface of the first virtual machine to the first display device (210). For example, the hypervisor can receive the content from the first virtual machine and provide the content to the client corresponding to the first display device.

The media device may provide content that corresponds with a continuation of the content the first virtual machine presented during a last session. For example, the first virtual machine may provide content for the last viewed channel, menu, game, or movie. In one example, when a user switches display devices and the user is playing a game on one display device, the first virtual machine pauses the game upon termination of the session with the display device and resumes the game when the user creates a new session with the first virtual machine on another display device. In some implementations, the first virtual machine may allow the user to select an option of whether the user would like the current session to be paused and continued at a later time. In some implementations, when a virtual machine having previous session data is launched, the virtual machine may allow the user to select whether the previous session should be continued or a new session should be started.

The media device provides instructions for presentation of the selection menu to a second display device (212). For example, the hypervisor can provide the instructions for the selection menu across a network to a second display device.

The media device receives a second selection of a second virtual machine (214). The second virtual machine is one of the multiple virtual machines and is different from the first virtual machine. The media device may receive the second selection from an integrated client included in the second display device or from a discrete hardware client. The second virtual machine may include the same operating system, e.g., the same or a different version of the operating system, as the first virtual machine and provides the same types of content as the first virtual machine.

The media device executes the second virtual machine (216). That is, the hypervisor identifies and launches the second virtual machine. If log-in credentials are received, the hypervisor may verify the credentials prior to launching the second virtual machine.

The media device provides a second stream of content for a second user interface of the second virtual machine to the second display device while providing the first stream to the first display device (218).

The order of steps in the process 200 described above is illustrative only, and providing content to two display devices at the same time can be performed in different orders. For example, the media device may provide instructions for presentation of the selection menu to the second display device across the network prior to providing instructions for presentation of the selection menu to the first display device across the local area network.

In some implementations, the process 200 can include additional steps, fewer steps, or some of the steps can be divided into multiple steps. For example, when the first user interface is a menu, the media device may receive a first selection in the first user interface, and provide a first video stream across the local area network to the first display device. The content of the first video stream may be a live television program, a recorded program, a streaming movie, a game, and so on.

Similarly, when the second user interface is a menu, the media device may receive a second selection in the second user interface, and provide a second video stream, different from the first video stream and the first user interface, across the network to the second display device while providing the first video stream or the first user interface to the first display device.

When the video streams are streams of live televised content, the hypervisor may select the first video stream with a first tuner in the media device and select the second video stream with a second tuner in the media device.

In some implementations, the media device may detect a property of the second display or the network and optimize the second stream of content or the second user interface using the property. For example, when the network is different from the local area network, e.g., a wide area network versus a local area network, a gateway may configure network address translation for communications between the hypervisor on the media device and the second display device to optimize the second stream of content for a latency of the network.

When a client, e.g., an integrated client or a discrete client, receives a command from a control device, e.g., a controller or remote control, the client may forward the command to a media device and the hypervisor executing on the media device. The media device may process the received command and forward the processed command to the hypervisor, which identifies the virtual machine that is the destination of the command.

Figure 3:
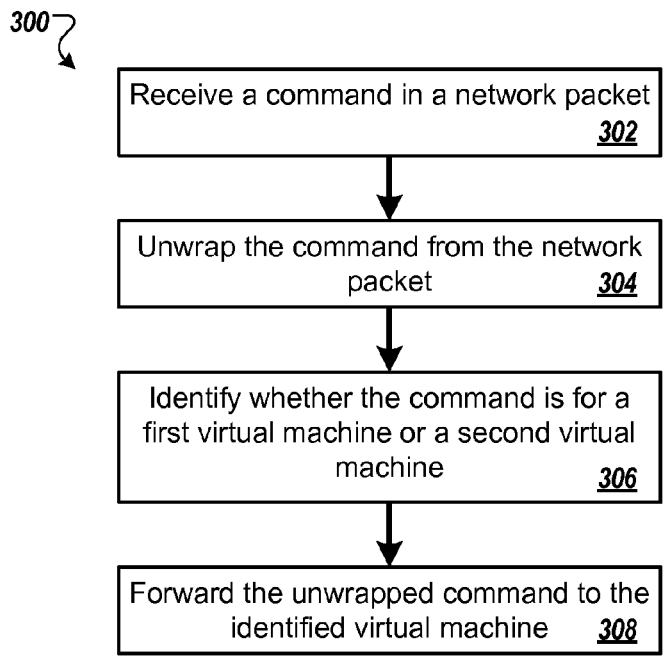
FIG. 3 is a flow diagram of a process for forwarding a command to a virtual machine.

FIG. 3 is a flow diagram of a process 300 for the hypervisor forwarding a command to a virtual machine. For example, the process 300 can be used by a media device, e.g., the set top box 102 or the game console 108 from the environment 100.

The media device receives a command in a network packet (302). For example, the media device can receive one or more network packets that include data representing a command from a software client.

The media device unwraps the command from the network packet (304). For example, the media device can determine that the one or more packets correspond with the same command, unwrap the data from the network packets, and combine the data.

The media device identifies, using a hypervisor, whether the command is for a first virtual machine or a second virtual machine (306). For example, the hypervisor can use data included in the packet to determine which virtual machine is the destination of the command.

The media device forwards the unwrapped command to the identified virtual machine (308). The identified virtual machine receives the command and performs an action based on the command, for example, opening a menu or selecting a content source, e.g., a channel or a game.

In some implementations, the hypervisor provides the command to the identified virtual machine such that the identified virtual machine believes the command was received directly from an input device, e.g., a wireless receiver.

In some implementations, the process 300 can include additional steps, fewer steps, or some of the steps can be divided into multiple steps. For example, the media device may receive a command, e.g., perform step 302, and forward the command to the identified virtual machine, e.g., perform steps 306 and 308, without unwrapping the command.

Figure 4:
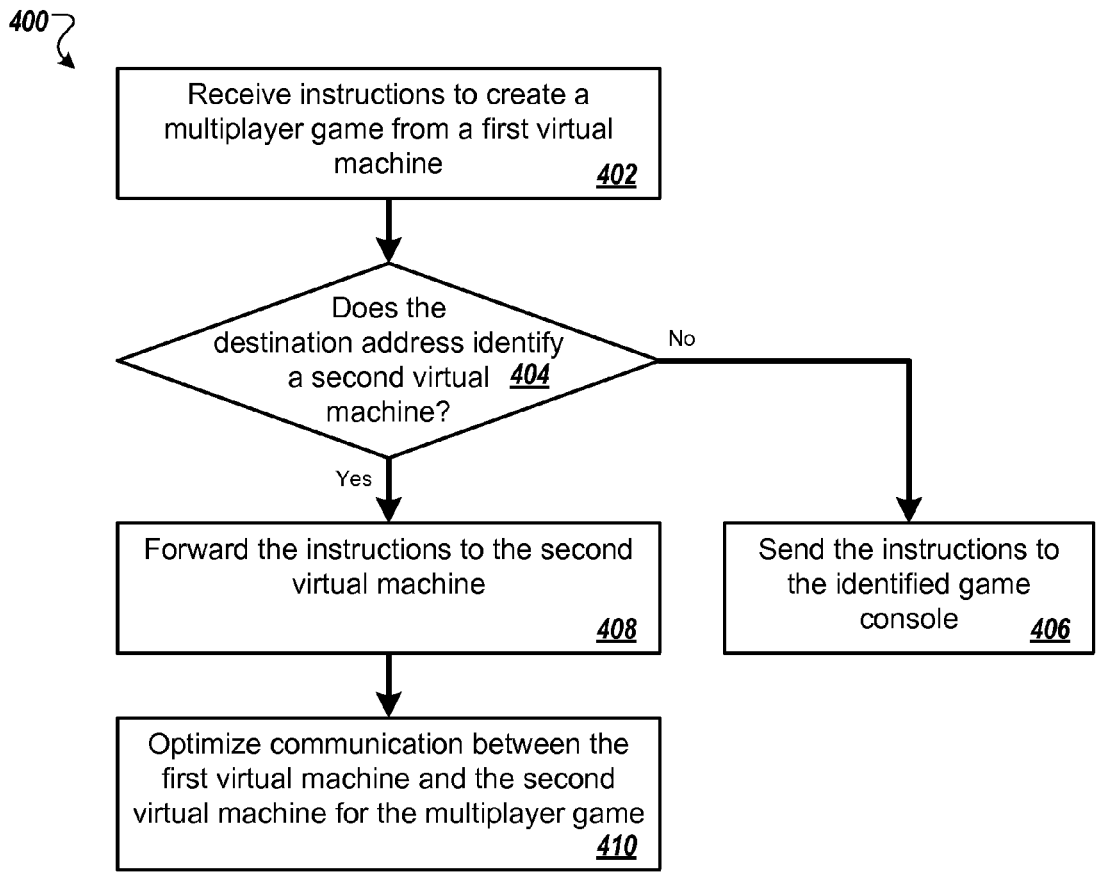
FIG. 4 is a flow diagram of a process for optimizing communication between two virtual machines.

FIG. 4 is a flow diagram of a process 400 for optimizing communication between two virtual machines. For example, the process 400 can be used by a hypervisor executing on a media device, e.g., the set top box 102 or the game console 108 from the environment 100.

The hypervisor receives instructions to create a multiplayer game from a first virtual machine executing a game console operating system (402). The instructions include a destination address, e.g., an IP address, of a second game console and data that the second game console will use to create a connection with the first virtual machine for the multiple player game.

The hypervisor determines whether the destination address identifies a second virtual machine (404). For example, the hypervisor may determine whether the destination address matches the IP address of a second virtual machine executing on the same device as the first virtual machine, e.g., whether the second game console is the second virtual machine.

If the destination address does not match the address of a second virtual machine, the hypervisor sends the instructions across a local area network to the identified game console (406). The hypervisor may send the instructions across a wide area network connected to the local area network, e.g., the Internet, to the destination device.

If the destination address matches the address of a second virtual machine, the hypervisor forwards the instructions to the second virtual machine without sending the instructions across the local area network (408). The second virtual machine executes the same game console operating system as the first virtual machine and executes on the same device as the first virtual machine. The instructions provide the second virtual machine with a request to create a multiplayer game or instructions for a previously created multiplayer game, e.g., communication between the two virtual machines regarding the multiplayer game.

The hypervisor optimizes communication between the first virtual machine and the second virtual machine during the multiplayer game (410). For example, after the connection for the multiplayer game has been created, the hypervisor can receive game data for the multiplayer game from the first virtual machine and provide the game data to the second virtual machine without sending the game data across a network, i.e., without sending the game data across either a local area network or a wide area network.

In some implementations, the hypervisor monitors the requests, e.g., processor requests, from the first virtual machine and the second virtual machine for duplicate requests. For example, when the first virtual machine and the second virtual machine present the same content or a portion of the same content, the hypervisor may receive a request to generate the portion of the same content from each of the virtual machines, queue both requests, and provide a single request to the hardware executing the virtual machines, e.g., a graphics card. When the hypervisor receives a response to the request, the hypervisor provides the response to both virtual machines.

In some implementations, the process 400 can include additional steps, fewer steps, or some of the steps can be divided into multiple steps. For example, the hypervisor may assign a first IP address to the first virtual machine, and assign a second IP address to the second virtual machine where the second IP address is different from the first IP address.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   executing a hypervisor on a device, wherein the hypervisor monitors a plurality of virtual machines, wherein each of the virtual machines executes a different instance of an operating system;
   providing, by the device, first instructions for presentation of a selection menu across a local area network to a first display device, the instructions including information for selection of a virtual machine from the plurality of virtual machines;
   receiving, by the device, a first selection of a first virtual machine from the plurality of virtual machines;
   executing, by the device, the first virtual machine;
   providing, by the device, a first stream of content for a first user interface of the first virtual machine to the first display device;
   receiving, by the device, a first selection in the first user interface requesting access to a television tuner and a corresponding stream of video content;
   assigning, by the hypervisor, a first television tuner included in the device to the first virtual machine in response to receiving the first selection in the first user interface requesting access to a television tuner and a corresponding stream of video content;
   providing, by the device, a first video stream from the first television tuner included in the device across the local area network to the first display device based on the first selection;
   providing, by the device, second instructions for presentation of the selection menu across a network to a second display device;
   receiving, by the device, a second selection requesting access to a television tuner and a corresponding stream of video content;
   determining, by the device, that all television tuners included in the device are in use and no additional television tuners included in the device are available to provide a second video stream different from the first video stream across the network to the second display device while providing the first video stream from the first television tuner to the first display device; and
   providing, by the device, the first video stream from the first television tuner across the network to the second display device while providing the first video stream from the first television tuner across the local area network to the first display device in response to determining that no additional television tuners are available to provide a second video stream, different from the first video stream, across the network to the second display device.

2. The method of claim 1, further comprising:
   detecting a property of the second display or the network; and
   providing a second video stream to the second display by optimizing the first video stream using the property.

3. The method of claim 2, wherein the network is different from the local area network, the method further comprising:
   configuring network address translation to enable communications between the hypervisor and the second display device through a gateway that connects the local area network and the network, wherein the property is selected from the group consisting of a latency of the network, a bandwidth of the network, a size of the second display, and a resolution of the second display.

4. The method of claim 1, further comprising:
   receiving a third selection in the first user interface to record a first program;
   receiving a fourth selection in a second user interface for a second virtual machine to record a second program;
   determining that the first program is the same program as the second program;
   recording the first program once; and
   providing the first virtual machine and the second virtual machine access to the recorded first program.

5. The method of claim 1, further comprising:
   providing a selection menu in a third user interface allowing a selection of a video stream provided to one of the plurality of virtual machines in response to determining that no additional television tuners are available to provide a second video stream, different from the first video stream, across the network to the second display device; and
   receiving a third selection for the first video stream in response to providing the selection menu in the third user interface allowing a selection of a video stream provided to one of the plurality of virtual machines, wherein providing the first video stream from the first television tuner across the network to the second display device is in response to the receipt of the third selection for the first video stream.

6. The method of claim 1, wherein providing the first video stream from the first television tuner across the network to the second display device while providing the first video stream from the first television tuner across the local area network to the first display device comprises creating a secondary session for the second display device to the first virtual machine to concurrently provide a single content stream of the first virtual machine to the first display device and the second display device.

7. The method of claim 6, comprising allowing the first display device to control the first virtual machine while preventing the second display device from controlling the first virtual machine.

8. A system comprising:
one or more television tuners including a first television tuner;
a game console that comprises:
a data processing apparatus; and
one or more memories storing instructions that, when executed by the data processing apparatus, cause the data processing apparatus to perform operations comprising:
executing a hypervisor, wherein the hypervisor monitors a plurality of virtual machines, wherein each of the virtual machines executes a different instance of a game console operating system;
providing first instructions for presentation of a selection menu across a local area network to a first display device, the instructions including information for selection of a virtual machine from the plurality of virtual machines;
receiving a first selection of a first virtual machine from the plurality of virtual machines;
executing the first virtual machine;
providing a first stream of content for a first user interface of the first virtual machine to the first display device, wherein the first user interface comprises an interface for a first game console operating system;
receiving a first selection in the first user interface;
providing a first video stream from the first television tuner across the local area network to the first display device based on the first selection;
providing second instructions for presentation of the selection menu across a network to a second display device;
receiving a second selection requesting access to a television tuner and a corresponding stream of video content;
providing the first video stream from the first television tuner across the network to the second display device while providing the first video stream from the first television tuner across the local area network to the first display device;
receiving a third selection of a second virtual machine from the plurality of virtual machines;
executing the second virtual machine; and
providing a second stream of content for a second user interface of the second virtual machine to a third display device, wherein the second user interface comprises an interface for a second game console operating system that is a different game console operating system than the first game console operating system.

9. The system of claim 8, further comprising:
detecting a property of the second display or the network; and
providing a second video stream to the second display by optimizing the first video stream using the property.

10. The system of claim 9, wherein the network is different from the local area network, the operations further comprising:
configuring network address translation to enable communications between the hypervisor and the second display device through a gateway that connects the local area network and the network, wherein the property is selected from the group consisting of a latency of the network, a bandwidth of the network, a size of the second display, and a resolution of the second display.

11. The system of claim 8, further comprising:
receiving a third selection in the first user interface to record a first program;
receiving a fourth selection in a second user interface for a second virtual machine to record a second program;
determining that the first program is the same program as the second program;
recording the first program once; and
providing the first virtual machine and the second virtual machine access to the recorded first program.

12. The system of claim 8, further comprising:
providing a selection menu in a third user interface allowing a selection of a video stream provided to one of the plurality of virtual machines based on determining that no additional television tuners are available to provide a second video stream, different from the first video stream, across the network to the second display device; and
receiving a third selection for the first video stream in response to providing the selection menu in the third user interface allowing a selection of a video stream provided to one of the plurality of virtual machines, wherein providing the first video stream from the first television tuner across the network to the second display device is in response to the receipt of the third selection for the first video stream.

13. The system of claim 8, wherein providing the first video stream from the first television tuner across the network to the second display device while providing the first video stream from the first television tuner across the local area network to the first display device comprises creating a secondary session for the second display device to the first virtual machine to concurrently provide a single content stream of the first virtual machine to the first display device and the second display device.

14. A non-transitory machine readable storage medium embodying computer software, the computer software causing a computer to perform a method, the method comprising:
executing a hypervisor on the computer, wherein the hypervisor monitors a plurality of virtual machines, wherein each of the virtual machines executes a different instance of an operating system;
providing, by the computer, first instructions for presentation of a selection menu across a local area network to a first display device, the instructions including information for selection of a virtual machine from the plurality of virtual machines;
receiving, by the computer, a first selection of a first virtual machine from the plurality of virtual machines;
executing, by the computer, the first virtual machine;
providing, by the computer, a first stream of content for a first user interface of the first virtual machine to the first display device;

receiving, by the computer, a first selection in the first user interface requesting access to a television tuner and a corresponding stream of video content;

assigning, by the hypervisor, a first television tuner included in the device to the first virtual machine in response to receiving the first selection in the first user interface requesting access to a television tuner and a corresponding stream of video content;

providing, by the computer, a first video stream from the first television tuner in the computer across the local area network to the first display device based on the first selection;

providing, by the computer, second instructions for presentation of the selection menu across a network to a second display device;

receiving, by the computer, a second selection requesting access to a television tuner and a corresponding stream of video content;

determining, by the computer, that all television tuners included in the computer are in use and no additional television tuners included in the computer are available to provide a second video stream different from the first video stream across the network to the second display device while providing the first video stream from the first television tuner to the first display device; and providing, by the computer, the first video stream from the first television tuner across the network to the second display device while providing the first video stream from the first television tuner across the local area network to the first display device in response to determining that no additional television tuners are available to provide a second video stream, different from the first video stream, across the network to the second display device.

15. The machine readable storage medium of claim 14, the operations comprising:

receiving a third selection of a second virtual machine from the plurality of virtual machines;

executing the second virtual machine; and providing a second stream of content for a second user interface of the second virtual machine to a third display device while providing the first stream to the first display device, wherein the operating system comprises a set top box operating system and the first user interface and the second user interface comprise different instances of a television guide.

16. The machine readable storage medium of claim 14, the operations comprising:

receiving a third selection of a second virtual machine from the plurality of virtual machines;

executing the second virtual machine; and providing a second stream of content for a second user interface of the second virtual machine to a third display device while providing the first stream to the first display device, wherein the operating system comprises a game console operating system and the first user interface and the second user interface comprise different instances of a console interface.

17. The machine readable storage medium of claim 14, further comprising:

receiving information about a command in a network packet;

unwrapping the information about the command from the network packet;

identifying, by the hypervisor, whether the command is for the first virtual machine or second virtual machine from the plurality of virtual machines; and forwarding the unwrapped command to the identified virtual machine.

18. The machine readable storage medium of claim 14, further comprising:

detecting a property of the second display or the network; and providing a second video stream to the second display by optimizing the first video stream using the property.

19. The machine readable storage medium of claim 18, wherein the network is different from the local area network, the method further comprising:

configuring network address translation to enable communications between the hypervisor and the second display device through a gateway that connects the local area network and the network, wherein the property is selected from the group consisting of a latency of the network, a bandwidth of the network, a size of the second display, and a resolution of the second display.

20. The machine readable storage medium of claim 14, further comprising:

receiving a third selection in the first user interface to record a first program;

receiving a fourth selection in a second user interface for a second virtual machine to record a second program;

determining that the first program is the same program as the second program;

recording the first program once; and providing the first virtual machine and the second virtual machine access to the recorded first program.

21. The machine readable storage medium of claim 14, further comprising:

providing a selection menu in a third user interface allowing a selection of a video stream provided to one of the plurality of virtual machines in response to determining that no additional television tuners are available to provide a second video stream, different from the first video stream, across the network to the second display device; and receiving a third selection for the first video stream in response to providing the selection menu in the third user interface allowing a selection of a video stream provided to one of the plurality of virtual machines, wherein providing the first video stream from the first television tuner across the network to the second display device is in response to the receipt of the third selection for the first video stream.

22. A system comprising:

one or more television tuners including a first television tuner;

a set top box that comprises:

a data processing apparatus; and one or more memories storing instructions that, when executed by the data processing apparatus, cause the data processing apparatus to perform operations comprising:

executing a hypervisor, wherein the hypervisor monitors a plurality of virtual machines, wherein each of the virtual machines executes a different instance of a set top box operating system;

providing first instructions for presentation of a selection menu across a local area network to a first display device, the instructions including information for selection of a virtual machine from the plurality of virtual machines;

receiving a first selection of a first virtual machine from the plurality of virtual machines;

executing the first virtual machine;
providing a first stream of content for a first user interface of the first virtual machine to the first display device, wherein the first user interface comprises an interface for a first set top box operating system;
receiving a first selection in the first user interface;
providing a first video stream from the first television tuner across the local area network to the first display device based on the first selection;
providing second instructions for presentation of the selection menu across a network to a second display device;
receiving a second selection requesting access to a television tuner and a corresponding stream of video content;
providing the first video stream from the first television tuner across the network to the second display device while providing the first video stream from the first television tuner across the local area network to the first display device;
receiving a third selection of a second virtual machine from the plurality of virtual machines;
executing the second virtual machine; and
providing a second stream of content for a second user interface of the second virtual machine to a third display device, wherein the second user interface comprises an interface for a second set top box operating system that is a different set top box operating system than the first set top box operating system.

\* \* \* \* \*